(12) United States Patent
Connelly, Jr.

(10) Patent No.: US 6,511,605 B2
(45) Date of Patent: Jan. 28, 2003

(54) DEVICE FOR AUTOMATICALLY FEEDING SOLUBLE FLUID TREATING AGENTS IN TABLET FORM INTO A FLUID BODY

(75) Inventor: Thomas V. Connelly, Jr., Kirkwood, MO (US)

(73) Assignee: Stellar Manufacturing Company, Sauget, IL (US)

( * ) Notice: Subject to any disclaimer, the term of this patent is extended or adjusted under 35 U.S.C. 154(b) by 28 days.

(21) Appl. No.: 09/825,481

(22) Filed: Apr. 3, 2001

(65) Prior Publication Data

US 2002/0139757 A1 Oct. 3, 2002

(51) Int. Cl.[7] .................................................. C02F 1/00
(52) U.S. Cl. ..................... 210/749; 210/169; 210/198.1; 210/205; 210/241
(58) Field of Search ................................ 210/749, 169, 210/198.1, 205, 241

(56) References Cited

U.S. PATENT DOCUMENTS

| | | | |
|---|---|---|---|
| 3,356,460 A | | 12/1967 | King et al. |
| 3,390,695 A | | 7/1968 | King et al. |
| 3,483,989 A | | 12/1969 | Gopstein |
| 3,846,078 A | * | 11/1974 | Brett |
| 4,917,868 A | * | 4/1990 | Alexander et al. |
| 5,885,446 A | * | 3/1999 | McGrew, Jr. |

* cited by examiner

Primary Examiner—Betsey Morrison Hoey
(74) Attorney, Agent, or Firm—Blackwell Sanders Peper Martin LLP (57) ABSTRACT

A device for automatically feeding soluble fluid treating agents in tablet form into a fluid body having an elongated member, a platform member adaptable for holding a plurality of tablets and being selectively positionable relative to the fluid body, and an attachment mechanism for attaching the present device to a portion of the structure surrounding or containing the fluid body. When a plurality of tablets are loaded onto the platform member, the platform member can be selectively positioned such that any portion of one or more of the plurality of tablets can be immersed within the fluid body. Each tablet preferably includes an opening extending therethrough adaptable for receiving the elongated member, the present device having particular utility in a wide variety of different fluid treating applications including toilet bowl tank applications and swimming pool/spa applications.

61 Claims, 6 Drawing Sheets

DEVICE FOR AUTOMATICALLY FEEDING SOLUBLE FLUID TREATING AGENTS IN TABLET FORM INTO A FLUID BODY

TECHNICAL FIELD

The present invention relates generally to fluid treatment devices containing a supply of solid agents soluble in the fluid to be treated and, more particularly, to a device for automatically feeding soluble fluid treating agents in tablet form into a fluid body.

BACKGROUND ART

Water and other fluid treatment tablets containing a wide variety of different types of soluble treating agents are used in a wide variety of different fluid treatment applications such as water treatment, cleaning, laundry and dish washing applications, cooling tower applications, toilet bowl, pool and spa applications, sewage treatment and still other applications. For example, a wide variety of different types of toilet bowl tablets are available for sanitizing, cleaning and deodorizing toilet bowl water after each flush. In similar fashion, a wide variety of swimming pool and spa tablets are likewise available for use in controlling the chlorination, pH factor and total alkalinity of the swimming pool/spa water. In many of these applications, it is desirable for the soluble tablets to last a long time and to deliver a continuous prescribed dosage of treatment agents to the particular fluid body.

At the present time, these tablets are typically placed, for example, at the bottom of a toilet bowl tank or at the bottom of a swimming pool skimmer basket for fluid treatment purposes. These tablets are typically manufactured with sufficient treating agents to match a particular application such as a typical toilet bowl tank or a typically sized swimming pool or spa. However, as a tablet dissolves, the surface area of the tablet diminishes and the tablet delivers a declining dosage amount of treating agents thereby delivering less than the prescribed amount of agents to accomplish the particular fluid treatment application. As a result, additional tablets should be added during the dissolving process in order to maintain the desired chemical dosage level to accomplish the particular application.

This problem is best exemplified in the utilization of treatment tablets for sanitizing toilet bowl tanks. In this particular application, toilet bowl tablets presently marketed will typically kill 99.9% of germs in the toilet bowl water after each flush for up to approximately seven (7) weeks. However, these tablets will typically last up to twelve (12) weeks before they are completely dissolved. During the last five (5) weeks of usage, these tablets are generally too small in surface area to deliver enough chlorine or other treating agents to the fluid body to kill germs at the advertised 99.9% level. Therefore, in order to maintain the advertised germ kill rate, a user must add an additional tablet to the toilet bowl tank sometime during the dissolving process in order to maintain the advertised germ kill rate. If this additional tablet is, in fact, added to the fluid body along with the remainder of the first tablet, the combination of the two tablets will now deliver more sanitizing agents to the fluid body than is necessary. This is both undesirable and non-economical. In reality, a replacement tablet is typically not added to the toilet bowl tank until the first tablet is fully dissolved.

A similar problem also occurs in the swimming pool and spa environment. For example, many pool owners place a wide variety of water treatment tablets such as chlorine/sanitizing tablets into the skimmer basket in order to sanitize the pool water. As these tablets dissolve, the amount of chlorine delivered to the water diminishes. Eventually, the tablets stop delivering the proper amount of water treatment agents necessary to keep the pool clean and properly chlorinated. As in the case of the toilet bowl sanitizing tablets, a pool owner must again place additional tablets in the skimmer basket in order to achieve the proper chlorination level including keeping the pH factor and the total alkalinity within the proper range. Typically, additional tablets will have to be added to the skimmer basket every three to five days depending upon the pool water conditions.

Many different types of chemical feeders including liquid treatment devices for automatically dispensing treating agents into a liquid body have been designed and used. See, for example, U.S. Pat. Nos. 3,356,460; 3,390,695; and 3,483,989. However, most of these devices have been complicated to use and expensive to manufacture. The known non-pressurized devices typically have complicated valve arrangements that tend to fail over time and the known pressurized devices typically cover or immerse the bulk of the water treating tablets or other soluble agents with water and then require metering of the saturated solution.

It is therefore desirable to develop a simple, economical device which will store a plurality of fluid treatment tablets and automatically feed such tablets into the fluid body so as to maintain a relatively constant tablet surface area within the fluid body so as to deliver a substantially continuous prescribed treatment dosage to the fluid body.

Accordingly, the present invention is directed to overcoming one or more of the problems as set forth above.

DISCLOSURE OF THE INVENTION

In one aspect of the present invention there is disclosed a device for automatically feeding a plurality of soluble tablets into a fluid body, the present device including at least one elongated member, a platform member, and an attachment mechanism. The platform member is adaptable for holding a plurality of tablets, preferably in a stackable arrangement, and is selectively positionable relative to at least a portion of the length of the elongated member such that, when a plurality of tablets are arranged thereon, the platform member can be positioned such that any portion of one or more of the plurality of tablets can be immersed within the fluid body. The attachment mechanism is configured for positioning the device relative to the fluid body such that the platform member can be adjustably positioned within the fluid body. Although the attachment mechanism can take on a wide variety of different configurations depending upon the particular application, it will typically be attached to a portion of the structure surrounding or containing the fluid body.

The present device has particular utility in a wide variety of different fluid treatment applications including toilet bowl tank applications as well as swimming pool/spa applications. In these applications, the present device can be attached to any appropriate structure associated with the structure containing the fluid body such as any one of the plurality of side walls, floor portion, cover member or overflow tube associated with a typical toilet bowl tank, or it can be attached to the cover member, side wall, basket floor or basket handle assembly associated with a typical swimming pool/spa skimmer device. In a preferred embodiment, each tablet includes an opening extending therethrough adaptable for receiving the elongated member associated with the present device, each of the plurality of tablets being slidably positionable onto the elongated member and being supported by the platform member for movement therewith.

These and other aspects and advantages of the present invention will become apparent upon reading the detailed description in connection with the drawings and appended claims.

BRIEF DESCRIPTION OF THE DRAWINGS

For a better understanding of the present invention, reference may be made to the accompanying drawings in which.

DETAILED DESCRIPTION OF THE INVENTION

Figure 1:
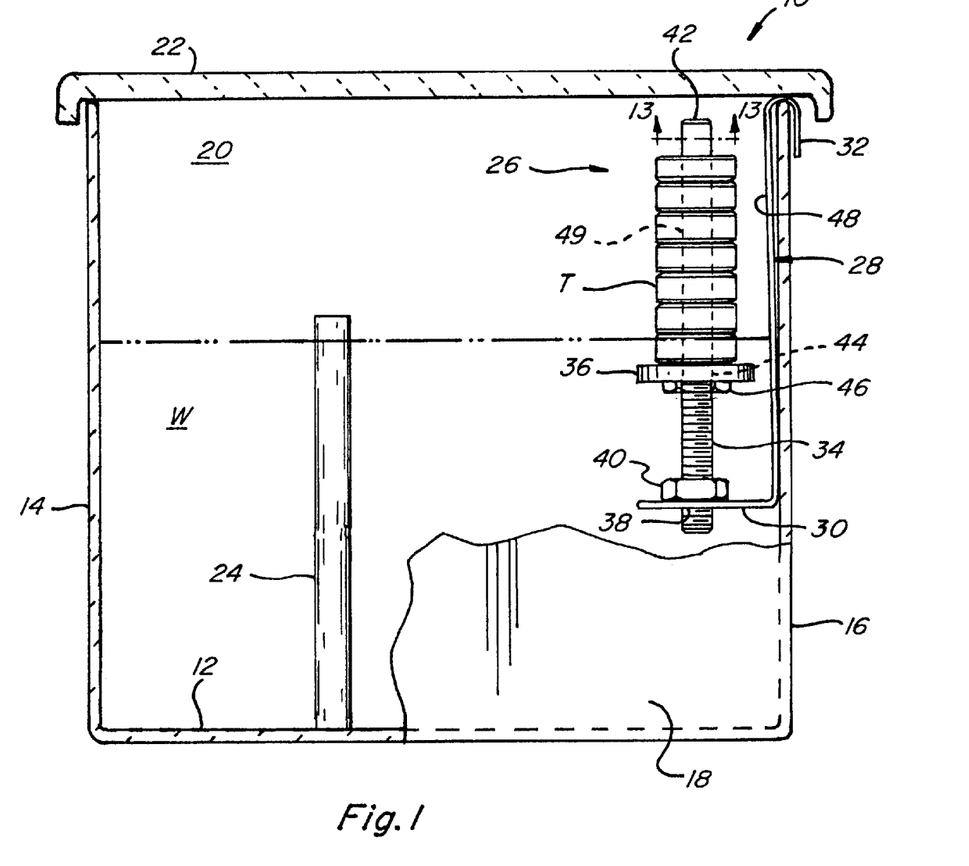
FIG. 1 is a cross-sectional view showing the inside of a typical toilet bowl tank and illustrating one embodiment of the present tablet feeder device operatively positioned therein.

Referring now to the drawings wherein like numerals refer to like parts, FIG. 1 illustrates one embodiment of a tablet feeder device 26 which is particularly adaptable for use in a toilet bowl tank such as the tank 10. Toilet bowl tank 10 includes a bottom wall or floor 12, a plurality of side walls extending upwardly therefrom such as the opposed side walls 14 and 16 and the opposed front and rear walls 18 and 20, and a lid or top closure member 22. One embodiment of the present tablet feeder device 26 includes a hanging bracket 28, an elongated member 34 and a moveable or adjustable platform member 36. The hanger member 28 includes a portion 30 having an opening 38 extending therethrough adaptable for receiving the elongated rod-type member 34. The elongated member 34 may be fixedly positioned with respect to hanger portion 30 by any suitable means such as by the use of a suitable fastening member such as fastening member 40, or the elongated member 34 could be integrally formed with hanger portion 30. In a preferred embodiment, elongated member 34 is adjustably moveable and positionable relative to the hanger portion 30 by any suitable means such as through the use of cooperatively engagable threaded means associated with both opening 38 and at least the lower portion of elongated member 34 such that the member 34 can be threadedly adjusted in a vertical direction relative to the top tank closure member 22. In this embodiment, the threaded fastening member 40 would again be utilized to hold the elongated member 40 at its selected position relative to hanger portion 30. This feature is advantageous because it enables a user to adjust the positioning of the elongated member in a vertical direction so as to ensure that the top end portion 42 of member 34 lies within the confines of the tank 10 and that all of the available head space or dry area between the lid member 22 and the water or fluid level W in the tank is utilized. It is recognized and anticipated that still other means for either fixedly or adjustably positioning elongated member 34 relative to hanger portion 30 may be utilized without departing from the spirit and scope of the present invention.

Platform member 36 is designed to hold a plurality of fluid treatment tablets when stackably arranged thereon as illustrated in FIG. 1. Importantly, platform member 36 is adjustably movable along at least a portion of the length of elongated member 34 relative to the fluid level W associated with the particular fluid body. This adjustability can be similarly accomplished in a wide variety of known methods such as by forming a threaded opening 44 extending through platform member 36, the opening 44 being cooperatively threadedly engagable with corresponding threads associated with elongated member 34 so as to threadedly adjust platform member 36 in a vertical direction along the length of elongated member 34 over at least a predetermined portion thereof. Alternatively, a suitable threaded member such as the member 46 could also be utilized to hold the platform member 36 at its selected location if, for example, the opening 44 is not threaded. Other means for adjustably moving platform member 36 are likewise envisioned and anticipated.

Hanger member 28 also includes a downturned flange portion 32 adaptable for engaging the peripheral top edge portion of any one of the wall members 14, 16, 18 and 20 associated with the toilet bowl tank 10 for removably positioning and mounting the present tablet feeder device 26 within a particular tank 10. Once the flange portion 32 of hanger member 28 is properly engaged with a peripheral edge portion of one of the tank wall members, the top closure member 22 will engage hanger flange portion 32 and securely hold the present device 26 in operative position within the tank 10. Here again, as will be hereinafter further discussed, it is recognized and anticipated that other means for positioning and holding the present device 26 in operative position within a particular toilet bowl tank 10 can be utilized without departing from the spirit and scope of the present invention. It is also recognized and anticipated that the entire device 26 including hanger member 28, elongated member 34, platform member 36 and any associated fastening members such as the members 40 and 46 will be constructed from any suitable, durable, non-corrosive material depending upon the type of fluid body in which the present device will be disposed for operation.

In operation, once the present tablet feeder device 26 is properly positioned within a fluid body such as within a typical toilet bowl tank 10 as illustrated in FIG. 1, a plurality of water treatment tablets T, each having a hole or aperture 49 formed therein, are slidably positioned over elongated member 34 such that the member 34 is received by and extends through the hole or aperture 49 associated with each respective tablet T. With the lowermost tablet resting upon the movable platform member 36 as shown in FIG. 1, platform member 36 is then adjustably positioned relative to elongated member 34 such that any portion of one or more of the lowermost tablets T are disposed or immersed in the fluid body for dissolution therein. In a typical toilet bowl tank application, the composition of the commercially available sanitation tablets typically require that only one tablet T be immersed within the fluid body to achieve the advertised germ killing action for a specified period of time. In this situation, as illustrated in FIG. 1, the platform member 36 is adjusted such that only the lowermost tablet T is positioned below the water or other fluid level W in the tank. As the lowermost tablet T dissolves, the tablet positioned immediately thereabove will slowly enter the water or fluid body thereby maintaining a relatively constant tablet surface area immersed within the fluid body. This automatic feeding of tablets allows the proper amount of treating agents to be continuously present in the fluid body such that a continuous prescribed dosage or desired concentration of the treating agents are always present in the fluid body for sanitation or other purposes. As the second tablet in the vertically stacked arrangement dissolves, the third tablet in such stacked arrangement would take its place and this process would be repeated until all of the tablets are dissolved. In this regard, the last or uppermost tablet positioned in the stackable arrangement could contain a die, smell or some other distinguishing characteristic which would tell the user that the last tablet associated with the device 26 is in use and the supply of tablets should be replenished for continued automatic water treatment operation.

The total number of tablets T which may be stackably arranged on the present device 26 will depend upon the amount of space existing between the surface level of the fluid body and the top of the tank 10. Depending upon the particular application involved as well as the particular composition and solubility of the tablets involved, it may be necessary to only immerse a portion of one tablet, or it may be necessary to immerse more than one tablet within the fluid body in order to achieve the desired concentration of treating agents within the fluid body. The present device 26 therefore allows maximum utilization of whatever dry head space exists in the particular application whether such application is a toilet bowl tank application as just described or some other water treating application as will be hereinafter further explained.

Figure 2:
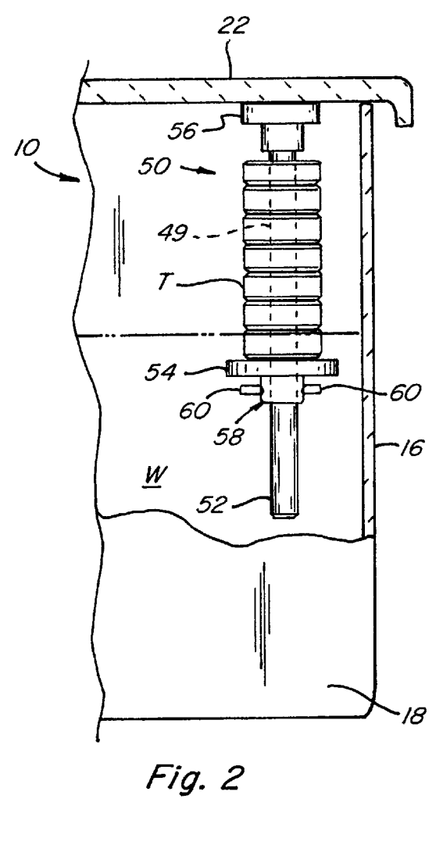
FIG. 2 is a partial cross-sectional view similar to FIG. 1 illustrating another embodiment of the present device attachable to the inner surface of the tank closure member.

FIG. 2 illustrates another embodiment 50 of the present tablet feeder device wherein the hanger member 28 has been eliminated and the device 50 is removably attached directly to the inner surface of the lid or top closure member 22. More particularly, the device 50 includes an elongated member 52, a movable platform member 54, and an attachment mechanism 56 associated with one end portion of the elongated member 54. The platform member 54 is again selectively adjustably movable relative to elongated member 52 so as to appropriately position the required portion or number of tablets T within the fluid body. This adjustment mechanism can be as previously described such as by using a platform member having a threaded opening such as the opening 44 (FIG. 1) associated therewith which is threadedly engagable with corresponding threads associated with the elongated member such as the elongated member 34 illustrated in FIG. 1; or by using a threadedly engagable adjusting member such as the member 46 illustrated in FIG. 1; or the platform member 54 may be adjustably movable along at least a portion of elongated member 52 by utilizing a slidably engagable clamping or pinching member 58 positioned below the platform member 54 as illustrated in FIG. 2, the pinching or clamping member 58 including one or more squeezable arm portions 60 which are normally biased to apply a gripping force to elongated member 52 in their normal unsqueezed condition, and which are specifically designed and adapted to release the gripping force applied to elongated member 52 when the arm portions 60 are squeezed or otherwise engaged by the hand of a user in a well known manner. The construction and operation of clamping member 58 as well as other clamping arrangements are well known in the art and can be easily adapted for use in the present invention. Squeezedly depressing arm portions 60 will allow a user to slidably position the clamping member 58 at any selected position along the length of elongated member 52 thereby similarly moving platform member 54 positioned and located thereabove. Once properly positioned, platform member 54 will rest upon and be supported by clamping member 58. Here again, a wide variety of other suitable adjustment mechanisms for moveably positioning platform member 54 along the length of elongated member 52 are envisioned and anticipated.

Attachment mechanism 56 can likewise take on any suitable form well known in the art such as a suction cup type member which can be selectively engaged anywhere along the inner surface of lid member 22. In order to stackably arrange a plurality of tablets T on top of platform member 54, access to elongated member 52 for slidably positioning such member within a corresponding opening 49 associated with each respective tablet T can be achieved from either end portion of elongated member 52. For example, attachment member 56 could be threadedly or otherwise removably engaged with one end portion of elongated member 52 such that when it is necessary to load the tablets T onto platform member 54, attachment member 56 can be threadedly removed and thereafter replaced once the tablets are properly positioned as previously explained with respect to FIG. 1. Alternatively, clamping member 60 and platform member 54 could be removed from the lower end portion of elongated member 52 and thereafter replaced once the tablets T are positioned on member 52. In similar fashion, if the adjusting member 46 is utilized in association with embodiment 50 to adjustably position platform member 54 in a manner as previously described with respect to platform member 36, the adjusting member 46 could likewise be threadedly removed from the lower end portion of the elongated member such that the platform member can be likewise removed for loading the tablets T. Still other mechanisms for loading tablets T onto elongated member 52 from either opposed end portion thereof are envisioned and anticipated.

It is also recognized that a suction type attachment mechanism could likewise be utilized in connection with the embodiment of the tablet feeder device 26 illustrated in FIG. 1. For example, any number of suction cup type attachment devices 56 could be fixedly attached to the substantially vertical portion 48 of hanger member 28 and the hanger flange portion 32 could be eliminated. With this type of construction, the device 26 could be selectively engaged with the inner surface of any wall portion associated with the toilet bowl tank 10 such as wall portions 14, 16, 18 and 20.

Figure 3:
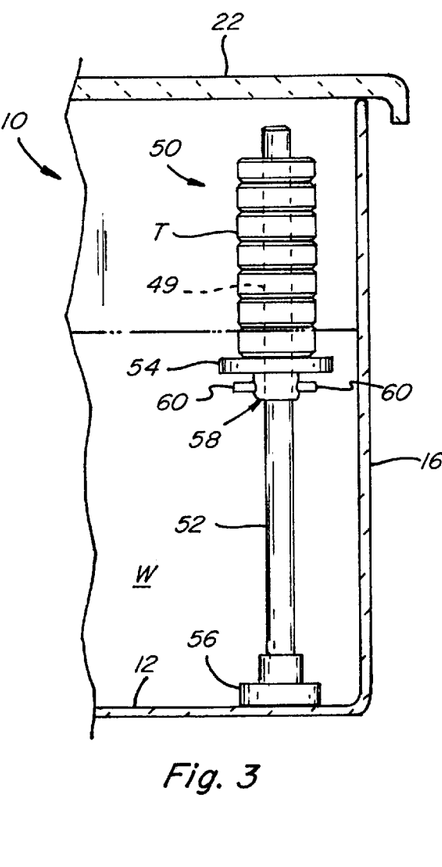
FIG. 3 is a partial cross-sectional view illustrating another embodiment of the present device attachable to the floor portion of the toilet bowl tank.

Still further, as best illustrated in FIG. 3, the tablet feeder device 50 can be easily attached to the bottom floor portion 12 of the tank 10 by merely repositioning the attachment mechanism 56 to the opposite end portion of the elongated member 52. Attachment of attachment mechanism 56 to the lower end portion of elongated member 52 can be accomplished in a manner similarly described with respect to embodiment 50 illustrated in FIG. 2. In addition, in this particular arrangement, since the upper end portion of elongated member 52 is open and readily exposed for easily stacking any plurality of tablets T on top of platform member 54, the attachment mechanism 56 could be permanently or fixedly attached to elongated member 52 or attachment mechanism 56 could be integrally formed therewith. Here again, still other means and methods for attaching a suction cup type member 56 or other suitable attachment means to the lower end portion of elongated member 52 are recognized and anticipated.

Figure 4:
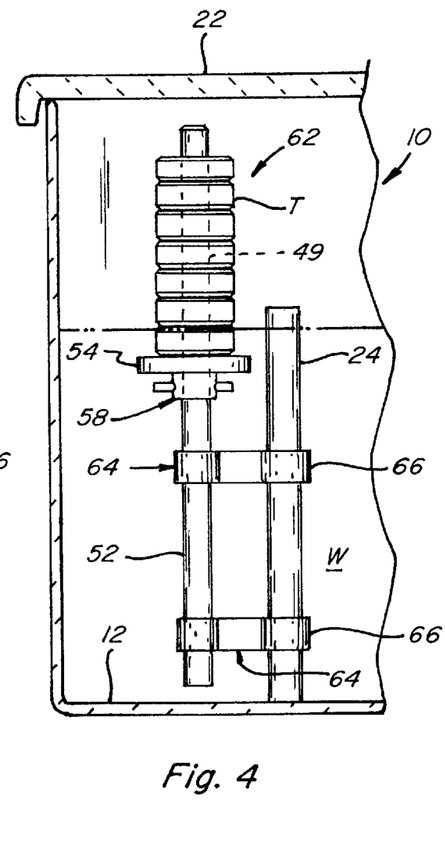
FIG. 4 is a partial cross-sectional view illustrating still another embodiment of the present device attachable to a typical overflow tube associated with a toilet bowl tank.

It is also recognized that any one of the embodiments 26 and 50 (FIGS. 1–3) could likewise be adapted for attaching such devices to the overflow tube 24 associated with a typical toilet bowl tank 10. For example, the elongated member 52 associated with the embodiment 62 illustrated in FIG. 4 could include one or more clamping mechanisms 64 associated with the lower portion thereof adaptable for engaging and attaching to the overflow tube 24 at any suitable location therealong. These clamping mechanisms 64 could include a band type member 66 which could be slidably positioned over the overflow tube 24. The members 66 could be adjustable and could include a tightening mechanism similar to the mechanisms associated with hose clamps utilized in the automotive industry whereby the members 66 could be tightened around the elongated member 52 at any location therealong, or the members 66 could merely encircle the overflow tube 24 and the lower end portion of the member 52 could engage the bottom floor portion 12 of the tank 10 so as to support the overall device 62 in an upright substantially vertical operative position. The band type members 66 may also take the form of a resilient clam-shell type member which could be biased open to fit over and engage the overflow tube 24 at any location therealong, the biasing force exerted by the members 66 when engaged with the overflow tube 24 being sufficient to hold the device 62 in its upright operative position. Still further, the clamping members 66 may take the form of a spring biased gripping mechanism constructed in accordance with the principals of operation associated with the clamping member 60. These types of clamping mechanisms are well known in the art. Still other attachment mechanisms are envisioned and anticipated for attaching either embodiment 26 or 50 of the present invention to a typical overflow tube 24.

Figure 5:
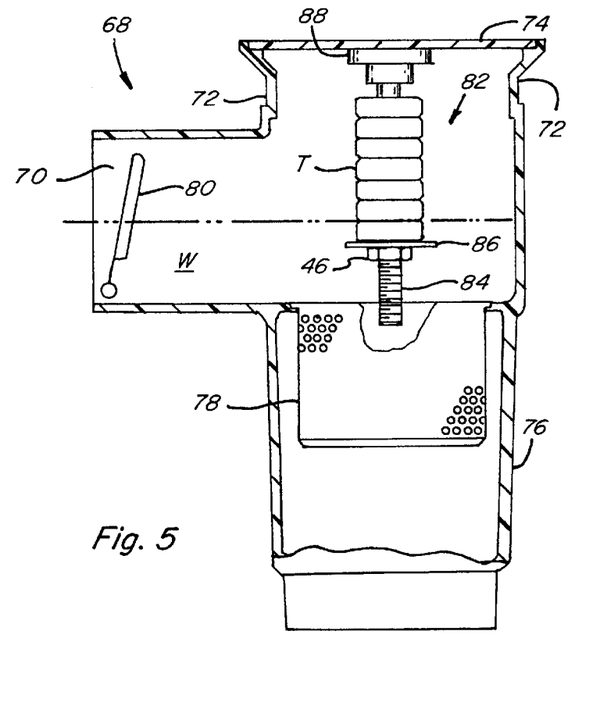
FIG. 5 is a cross-sectional view of a typical skimmer device showing another embodiment of the present invention operatively positioned therein.

FIG. 5 illustrates use of the present tablet feeder device in a swimming pool or spa environment and, in particular, in association with a typical skimmer device 68 commonly associated with swimming pools and spas. The skimmer device 68 includes a water or fluid inlet portion 70 commonly associated with a side wall surface of a swimming pool or spa, a collar portion 72 having a cover member 74 associated therewith, a water or fluid outlet portion 76 typically in communication with a suction pump and recirculating means for directing the water back into the pool or spa, and a skimmer basket 78 positioned in the outlet portion 76 for catching leaves and other debris which may accumulate within the particular pool or spa. The cover member 74 is typically positioned and located for access adjacent the pool deck area and when the cover 74 is removed, provides access to the skimmer basket 78 located therebelow. A flapper valve or weir assembly 80 is pivotally mounted adjacent entry to the inlet portion 70 which controls fluid flow through the skimmer device 68. As water flows through the skimmer device 68, debris will collect within the skimmer basket 78 for periodic removal therefrom through the cover member 74. Chlorinating tablets and other tablets containing fluid treating agents are typically placed at the bottom of the skimmer basket for dissolving into the water or fluid body.

The embodiment 82 of the present tablet feeder device includes an elongated member 84, a moveable or adjustable platform member 86 and an attachment mechanism 88 associated with one end portion of the elongated member 84. The platform member 86 is again selectively adjustably movable relative to elongated member 84 so as to appropriately position the required portion or number of tablets T within the fluid body. This adjustment mechanism can be as previously described with respect to embodiment 26 (FIG. 1) such as by using a suitable threaded member such as the member 46 as previously described to hold the platform member 86 at its selected location. As previously discussed, clamping member 58 as described with respect to FIGS. 2–4 could likewise be utilized in place of fastening member 46 to adjustably position platform member 86 at a desired selected location. Here again, a wide variety of other suitable adjustment mechanisms for movably positioning platform member 86 along the length of elongated member 84 are envisioned and anticipated.

Attachment mechanism 88 can likewise take on any suitable form well known in the art for attaching the device 82 to the lid or cover member 74 associated with skimmer device 68. Depending upon the size, shape and construction of the cover member 74, attachment mechanism 88 could be a suction cup type member which can be selectively engaged anywhere along the inner surface of cover member 74, or attachment mechanism 88 could be a bayonet/clip type arrangement, or attachment mechanism 88 could include a bracket construction which could be threadedly engaged or otherwise fixedly attached to cover member 74 by any suitable attaching means such as through the use of a plurality of screws or other fastening members. As with the device 50 illustrated in FIG. 2, the stacking of a plurality of tablets T on top of platform member 86 can be achieved from either end portion of elongated member 84. For example, threaded member 46 and platform member 86 could be removed from the lower end portion of elongated member 84 and thereafter replaced once the tablets T are positioned on member 86. Alternatively, the attachment mechanism 88 could be threadedly or otherwise removably engagable with the top end portion of elongated member 84 and could be removed when it is necessary to load the tablets T onto platform member 86. As previously discussed with respect to FIGS. 1–4, still other mechanisms for loading the tablets T onto elongated member 84 from either opposed end portion thereof are envisioned and anticipated.

When used in a swimming pool or spa environment as illustrated in FIG. 5, the platform member 86 can be selectively positioned so as to allow the proper number of water treating tablets, or any portion thereof, to be disposed or immersed in the fluid body for dissolution therein. This will depend upon the chemical composition of the individual tablets being used as well as the size of the particular swimming pool or spa involved. As illustrated in FIG. 5, only one water treating tablet is disposed below the water or other fluid level in the skimmer device 68. Here again, as the lowermost tablet T dissolves, the tablet positioned immediately thereabove will slowly enter the water or fluid body thereby maintaining a relatively constant tablet surface area immersed within the fluid body. This automatic feeding of tablets allows the proper amount of treating agents to be continuously present in the fluid body such that a continuous prescribed dosage or desired concentration of the treating agents contained within the tablets T are always present in the fluid body for chlorination, sanitation, or other water treatment purposes. In a swimming pool or spa environment, the automatic feeding device 82 more accurately maintains and controls the chlorination, pH factor and total alkalinity of the body of water.

Figure 6:
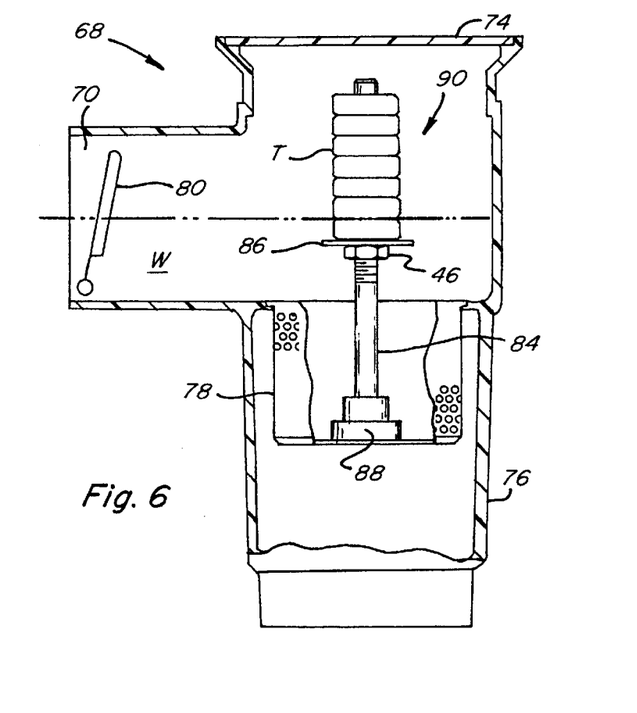
FIG. 6 is a cross-sectional view similar to FIG. 5 showing the present invention attachable to the bottom of the skimmer bucket.

FIG. 6 illustrates another embodiment 90 of the present tablet feeder device wherein the device 90 is attachable to the bottom of the skimmer basket 78. This can be accomplished by merely repositioning the attachment mechanism 88 to the opposite end portion of the elongated member 84. Attachment of the attachment mechanism 88 to the lower end portion of elongated member 84 can be accomplished in a manner similarly described with respect to embodiment 82 illustrated in FIG. 5. In addition, since the upper end portion of elongated member 84 is open and readily exposed for easily stacking any plurality of tablets T on top of the platform member 86, the attachment mechanism 88 could likewise be permanently or fixedly attached to elongated member 84 or such mechanism could be integrally formed with the lower end portion of member 84. Depending upon the depth of the skimmer basket 78, the overall length of elongated member 84 may be greater as compared to the length of member 84 illustrated in FIG. 5. As with embodiment 82, adjustment mechanism 88 can likewise take on any suitable form well known in the art for attaching to the bottom of the skimmer basket 78. As previously explained, attachment mechanism 88 could take the form of a suction cup type member, a bayonet/clip type arrangement, or member 88 could be attached to skimmer basket 78 through the use of any suitable fastening member or other attachment means depending upon the shape and construction of the bottom portion of the skimmer basket 78. In all other respects, operation of the device 90 is substantially identical with respect to operation of the device 82 (FIG. 5) including adjustment of the platform members 86.

Figure 7:
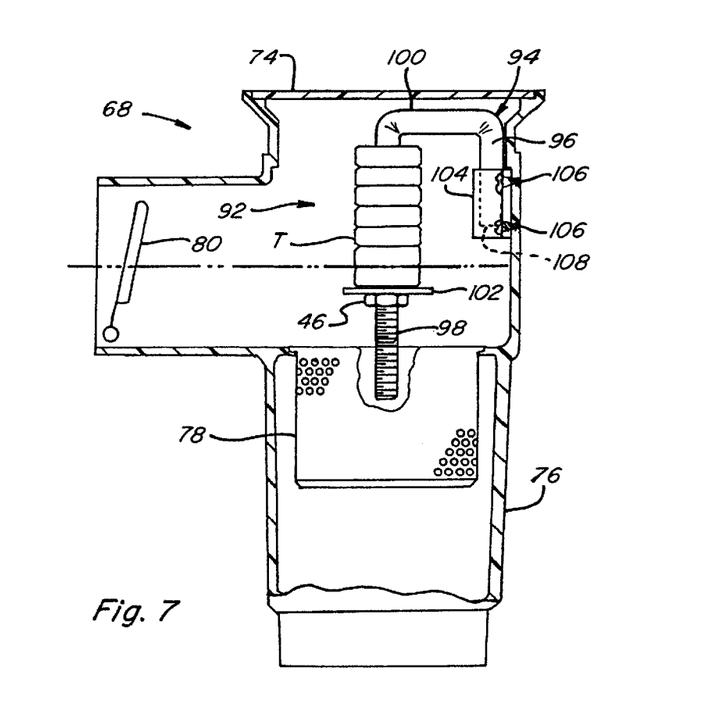
FIG. 7 is a cross-sectional view showing another embodiment of the present tablet feeder device attachable to a side wall of the skimmer device.

FIG. 7 illustrates another embodiment 92 of the present tablet feeder device wherein the device 92 is attached to the side wall of the skimmer device 68. In this particular embodiment, device 92 includes a substantially j-shaped member 94 having a pair of substantially parallel elongated portions 96 and 98, and an interconnecting portion 100 extending therebetween. Elongated portion 98 is substantially similar to elongated member 84 illustrated in FIGS. 5 and 6 and is constructed for adaptably receiving movable platform member 102 and adjustment member 46. The adjustability of platform member 102 along the length of elongated portion 98 can be accomplished in accordance with any one of the plurality of different methods discussed above including using the adjustment member 46. In the embodiment of FIG. 7, portions 96 and 100 of member 94 form an extension of elongated portion 98.

Attachment of device 92 to the side wall of a particular skimmer device such as the device 68 can likewise be accomplished in a wide variety of different arrangements such as by directly attaching the elongated portion 96 directly to the side wall of the skimmer device 68 via any suitable fastening member or, as illustrated in FIG. 7, elongated portion 96 could be either fixedly or removably positioned within a bracket member 104 which is fixedly secured to the side wall of the skimmer device 68 such as through the use of fastening members 106. Bracket member 104, when attached to the side wall of the skimmer device 68, defines an opening or space 108 for receiving at least the lower end portion of elongated portion 96. Depending upon size and shape of the space 108 in comparison to the elongated portion 96, the member 94 could be removably attached to bracket member 104. This would enable a user to totally remove the device 92 from the skimmer device 68 when it is necessary to reload the tablets T onto platform member 102. In this regard, the member 46 and 102 are adjustably removable from the lower end portion of the elongated portion 98 as previously explained. In all other respects, the operation of the tablet feeder device 92 is substantially similar to the operation of the devices 26, 50, 62 and 82 previously explained. It is also recognized and anticipated that the member 94 could be unitary in construction, or such member could be comprised of a plurality of cooperatively engagable members such as the portions 96, 98 and 100. Still further, it is recognized and anticipated that the member portions 96 and 100 could be formed into a unitary member and such member could be cooperatively engagable with or otherwise attachable to elongated portion 98 without departing from the spirit and scope of the present invention. Still other means and methods for attaching the tablet feeder device 92 to the side wall of a skimmer device 68 are envisioned and anticipated.

Figure 8:
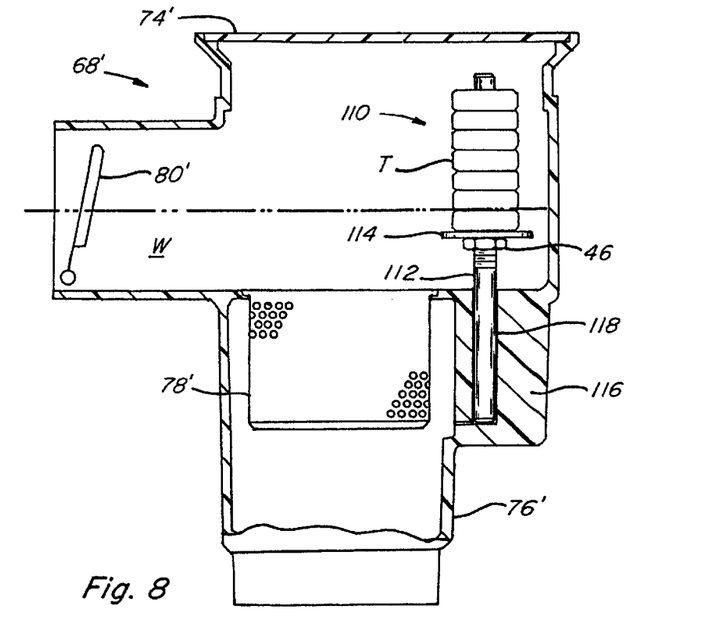
FIG. 8 is a cross-sectional view of another skimmer construction wherein the present tablet feeder device is incorporated for use therein.

FIG. 8 illustrates still another embodiment of the present invention wherein the tablet feeder device 110 is designed and built directly into the skimmer device 68'. In this particular embodiment, the back wall of the skimmer device 68 illustrated in FIGS. 5–7 has been extended to create a shoulder portion 116 in newly designed skimmer device 68' as illustrated in FIG. 8, the shoulder portion 116 including an elongated opening 118 adaptable for receiving the lower end portion of the elongated member 112 associated with the present device 110. The elongated member 112 is slidably positionable within the opening or slot 118 and the slot or opening 118 is of sufficient size and length to provide adequate upright support for the device 110 when it is loaded with the tablets T. The device 110 likewise includes an adjustably movable platform member 114 which functions and operates as previously disclosed with respect to the embodiments illustrated in FIGS. 1–7. Although it is preferred that the elongated member 112 be removable from slot or opening 118 for ease of loading the tablets T onto platform member 114, it is likewise recognized and anticipated that elongated member 112 can be fixedly secured or otherwise integrally formed with shoulder portion 116. In all other respects, the operation of the device 110 including selectively positioning platform member 114 is substantially similar to the operation previously described with respect to embodiments 26, 50, 62, 82, 90 and 92. Still other mechanisms for incorporating tablet feeder device 110 within a skimmer device such as the device 68' are envisioned and anticipated.

Figure 9:
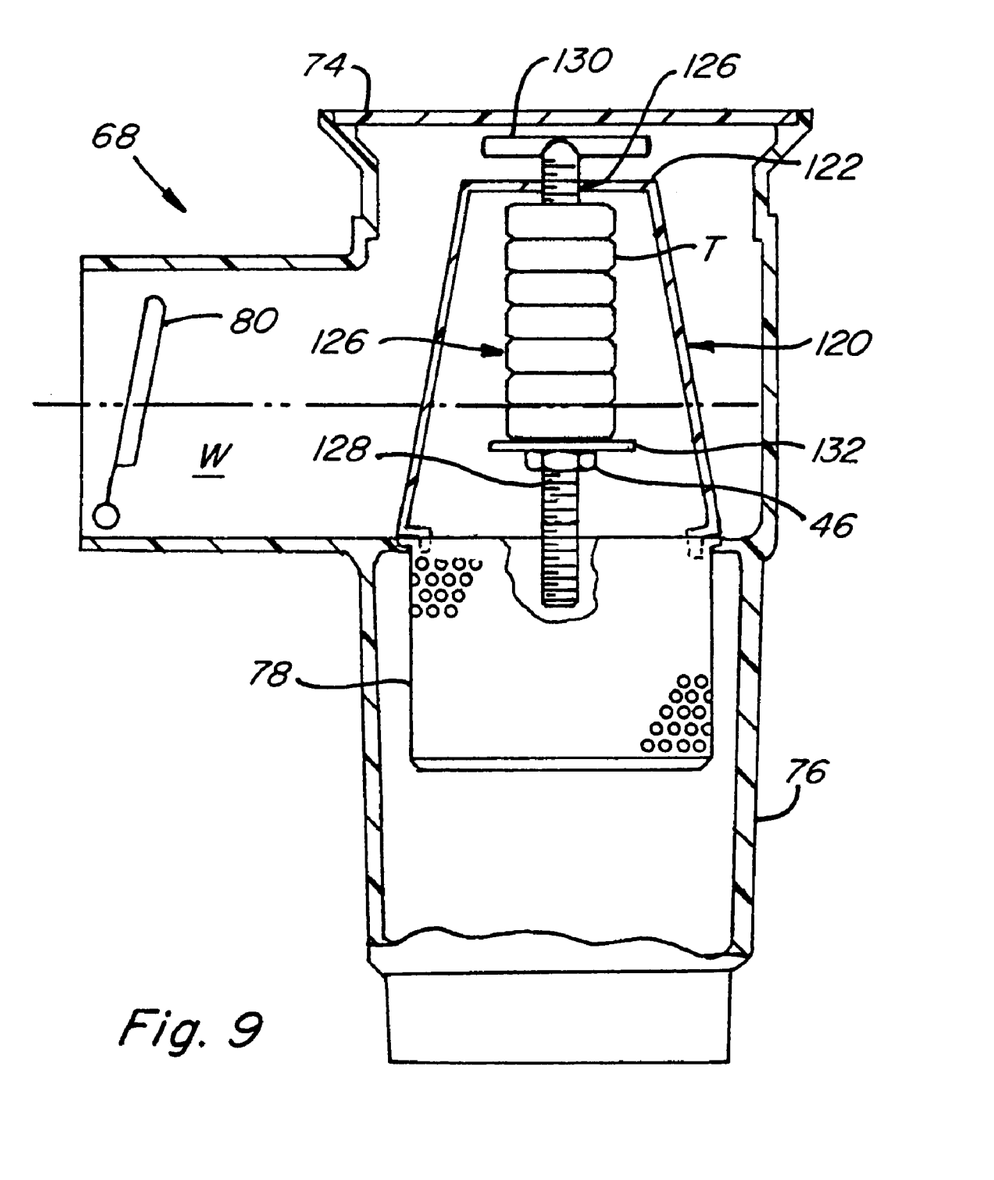
FIG. 9 is a cross-sectional view of still another embodiment of the present tablet feeder device wherein the present device is operatively positioned and mounted to the handle assembly associated with the skimmer basket.

FIG. 9 illustrates still another embodiment of the present invention wherein the skimmer basket 78 includes a handle portion 120 which extends above the basket 78 and includes a substantially horizontal portion 122. The tablet feeder device 126 includes an elongated member 128 which extends through an opening 124 in handle portion 122. In the embodiment illustrated in FIG. 9, the upper end portion of elongated member 128 as well as opening 124 are correspondingly threaded for cooperative engagement respectively therewith. A handle member 130 threadedly engagable with the upper end portion of elongated member 128 is provided to enable a user to adjust the position of elongated member 128 relative to threaded opening 124. In the event that opening 124 is not threaded, handle member 130 will serve as a stop means for holding elongated member 128 in engagement with handle portion 122.

Tablet feeder device 126 likewise includes a platform member 132. If opening 124 is threaded, handle member 130 can be used to adjustably position the location of platform member 132 relative to the water line by merely rotating handle member 130 in the appropriate direction. The associated head space between cover member 74 and handle portion 122 may limit this method of adjusting platform member 132. On the other hand, if rotation of handle member 130 is limited, or if opening 124 is not threaded and handle member 130 is merely used to hold elongated member 128 in proper position, platform member 132 can be constructed so as to be adjustably positionable as previously described such as by any one of the adjustment means previously described with respect to the various embodiments of the present invention illustrated in FIGS. 1–8 including use of the adjustment member 46. In all other respects, the construction and operation of the tablet feeder device 126 is as previously described with respect to the various embodiments previously disclosed. Loading of the tablets T onto the platform member 132 can likewise be accomplished as previously described by either disengaging the elongated member 128 from the handle portion 122 or by removing platform member 132 and any associated adjustment means such as the adjustment member 46 from the lower portion of elongated member 128. Still other attachment mechanisms and methods for attaching device 126 to a handle assembly 120 associated with a particular skimmer basket 78 are envisioned and anticipated.

Figure 10:
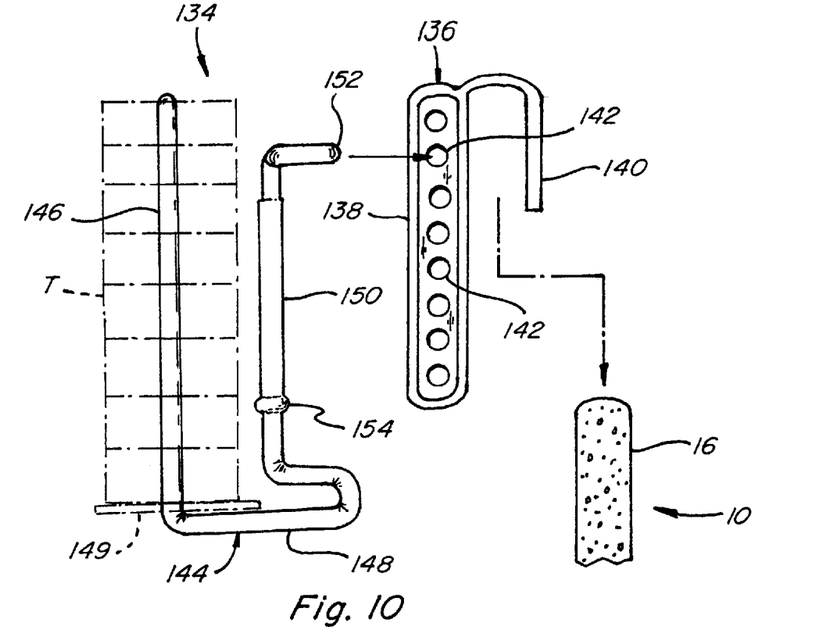
FIG. 10 is an exploded side elevational view illustrating still another embodiment of the present device attachable to any one of the wall members associated with a typical toilet bowl tank.
Figures 11, 12:
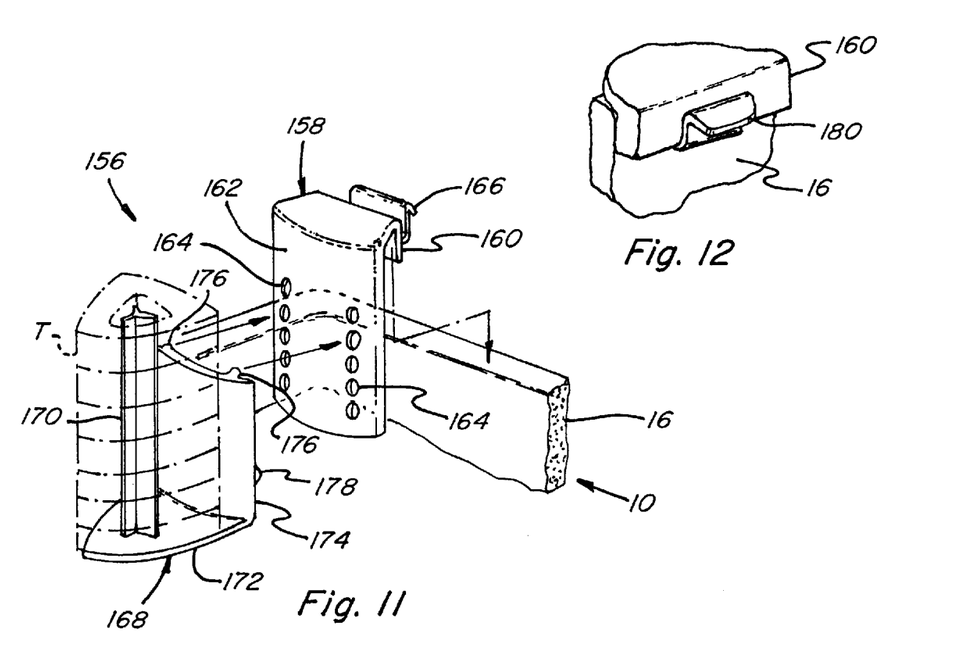
FIG. 11 is an exploded perspective view illustrating a further embodiment of the present device attachable to any one of the wall members associated with a typical toilet bowl tank.
FIG. 12 is a partial perspective view showing an alternative tab arrangement associated with the embodiment illustrated in FIG. 12.

FIGS. 10 and 11 illustrate still other embodiments 134 and 156 of the present tablet feeder device for use in association with a typical toilet bowl tank. As illustrated in FIG. 10, the device 134 includes a bracket or hanger member 136 having a substantially vertical portion 138 and a downturned flange portion 140 somewhat similar to flange portion 32 illustrated in FIG. 1. The downturned flange portion 140 is adaptable for engaging the peripheral top edge portion of any one of the wall members 14, 16, 18 and 20 associated with the toilet bowl tank 10 for removably positioning and mounting the tablet feeder device 134 within a particular tank 10. As with hanger member 28 (FIG. 1), once the flange portion 140 is properly engaged with a peripheral edge portion of one of the tank wall members, the top closure member associated with the tank 10 such as closure member 22 (FIG. 1) will engage hanger flange portion 140 and securely hold the present device 134 in operative position within the tank 10 as will be hereinafter further explained. The substantially vertical portion 138 of hanger member 136 includes a plurality of openings 142 for adjustably positioning and locating the tablet holding member 144. In this regard, member 144 includes an elongated portion 146 adaptable for receiving a plurality of fluid treatment tablets T as previously explained with respect to FIGS. 1–4, a substantially horizontal portion 148 for supporting and holding the plurality of fluid treatment tablets T when stackably arranged on elongated portion 146, and a portion 150 adaptable for engaging any one of the plurality of openings 142 associated with hanger member 136. In the particular embodiment illustrated in FIG. 10, the tablet holding portion 150 includes a hook-like member 152 adaptable for being insertably received within any one of the plurality of openings 142. The plurality of openings 142 and the hook member 152 provide the necessary vertical adjustability of the tablet holding member 144 relative to the fluid level associated with a particular fluid body such that any portion of one or more of the lowermost tablets T can be disposed or immersed in the fluid body for dissolution therein. A marker or indicator member 154 can be associated with tablet holding portion 150 as an aid in attaching member 144 to hanger or bracket member 136 at the appropriate height relative to the water or fluid level in the particular tank. For example, the member 144 can be attached to member 136 such that the marker or indicator 154 will lie at the water or fluid line associated with the tank 10. The marker 154 can likewise be made slidably movable along member portion 150 whereby it can be positioned and located such that any portion of one or more of the plurality of tablets T associated with member 144 can be immersed within the fluid body. It is also recognized that table holding member 144 may include a more defined platform member such as member 149 for providing support for the tablets T across a greater portion of their bottom surface. The plurality of tablets T are loaded onto elongated member 146 as previously explained with respect to the devices illustrated in FIGS. 1, 3 and 4 by simply slidably positioning such tablets over elongated member 146. In all other respects, the operation of the tablet feeder device 134 is substantially similar to embodiments 26, 50 and 62 discussed above.

FIG. 11 illustrates still another embodiment 156 of the present device adaptable for use with a typical toilet tank 10. Device 156 likewise includes a bracket or hanger member 158 which likewise includes a downturned flange portion 160 adaptable for engaging the peripheral top edge portion of any one of the wall members associated with a particular toilet bowl tank such as wall member 16, and an elongated main body portion 162 having at least two sets of spaced apart openings 164 associated therewith for receiving cooperatively engageable means associated with the tablet holding member 168 as will be hereinafter explained. The hanger member 158 likewise includes a tab 166 for facilitating removal of the flanged portion 160 from the peripheral top edge portion of any one of the wall members associated with the toilet bowl tank.

In this particular embodiment, the device 156 also includes a tablet holding member 168 which likewise includes an elongated member 170, a holding and supporting platform portion 172, and a portion 174 adaptable for cooperatively engaging the main body portion 162 of hanger member 158. In this regard, the tablet holding portion 174 includes a pair of hook or finger-like members 176 adaptable for being insertably engaged with any one of a corresponding pair of spaced openings 164, the hook-like members 176 being engaged with the appropriate openings 164 so as to achieve the proper positioning of the platform portion 172 relative to the water or fluid level in the tank depending upon how many tablets need to be immersed within the fluid body. Here again, the offset plurality of openings 164 in conjunction with the hook-like members 176 provide the necessary adjustability of the tablet holding member 168 in order to achieve the desired concentration of treating agents within the fluid body. A marker or indicator 178 similar to the indicator 154 (FIG. 10) can likewise be provided on member portion 174 to facilitate the proper positioning of the tablet holding member 168 relative to the fluid body in the tank 10.

An alternative tab member 180 illustrated in FIG. 12 can be used in place of tab portion 166 illustrated in FIG. 11. In all other respects, the operation of embodiment 156 is substantially similar to the operation of embodiment 134 illustrated in FIG. 10. Loading of the tablets T onto elongated portion 170 can likewise be accomplished as previously described with respect to embodiment 134. Still other attachment mechanisms and methods for attaching the tablet holding members 144 and 168 to their respective bracket members 136 and 158 are likewise envisioned and anticipated.

INDUSTRIAL APPLICABILITY

FIGS. 1–12 illustrate various embodiments of the present device for automatically feeding soluble fluid treating agents in tablet form into a fluid body. More particularly, the embodiments 26, 50, 62, 82, 90, 92, 110, 126, 134 and 156 illustrate specific use of the present invention in association with toilet bowl, pool and spa applications. It is also recognized and anticipated that the various embodiments of the present tablet feeder device could likewise have utility in a wide variety of other fluid treatment applications wherever a supply of agents of any type must be added to the fluid body. For example, the present devices could be easily adaptable for use in an animal feeding application wherein nutrients and other vitamins could be provided in solid tablet form for dissolution in the drinking water or liquid feed being provided to a wide variety of different types of animals in a farm or feed lot environment. In similar fashion, the present invention can likewise be utilized in sewage treatment applications; cleaning, laundry and dish washing applications; cooling tower and other water supply applications; and in a wide variety of other applications where soluble agents in tablet form can be provided to a fluid body to achieve a specific purpose. In this regard, it is recognized that various forms of the present tablet feeder device could be utilized without departing from the spirit and scope of the present invention.

Figure 13:
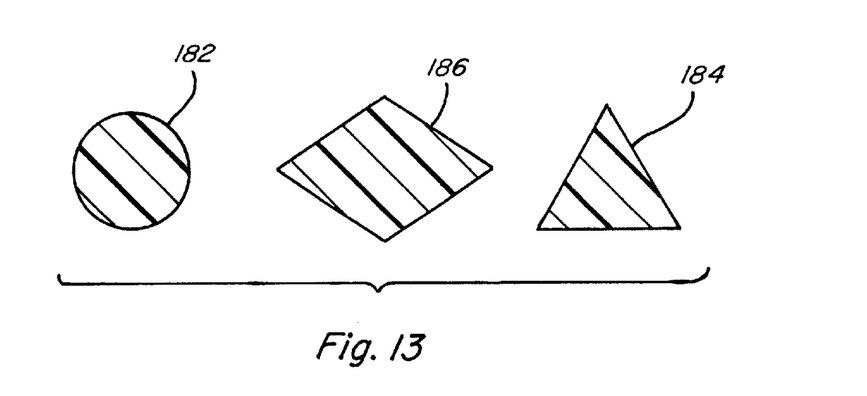
FIG. 13 is a cross-sectional view taken along line 13—13 of FIG. 1 showing various cross-sectional shapes which can be utilized in association with the elongated member of the present device.

As illustrated in FIG. 13, it is also recognized and anticipated that the cross-sectional shape of the elongated members 34, 52, 84, 98, 112, 128, 146 and 170 could take on a wide variety of different shapes including a circular cross section 182, a triangular cross section 184 and a diamond shaped cross section 186 as illustrated, as well as a wide variety of still other cross-sectional shapes. In this regard, it is recognized that all of the cooperatively engagable threaded constructions disclosed in the various embodiments illustrated in FIGS. 1–10 are specifically adaptable for use with a substantially circular or rod-shaped elongated member such as the members 34, 52, 84, 98, 112, 128 and 146. If other cross-sectional shapes are utilized for these members such as member 170 illustrated in FIG. 11, all openings or apertures constructed to receive such members will be correspondingly shaped and, importantly, adjustment members such as the threaded members 40 and 46 would be replaced with other slidably engagable clamping or pinching members constructed to conform to the particular cross-sectional shape of the respective elongated member similar to the clamping member 58 previously described. Other clamping arrangements well known in the art can likewise be easily adapted for use with the present devices depending upon the cross-sectional shape of the elongated members 34, 52, 84, 98, 112, 128, 146 and 170. In this particular situation, the hole or aperture 49 through each of the respective tablets T would likewise be formed so as to be compatible with the cross-sectional shape of the elongated member over which they will be positioned.

By varying the shape of the tablet hole 49 and elongated members 34, 52, 84, 98, 112, 128, 146 and 170, it is also possible to customize the feeder device and tablet products for a given marketer. For example, marketer A could have a tablet with a substantially round hole for use with a substantially round elongated member; marketer B could have a tablet with a substantially square hole for use with a substantially square elongated rod; and marketer C could have a tablet with a triangularly shaped hole for use with a triangularly shaped elongated member. It is also recognized and anticipated that the present devices could be attachable to any wall or surface associated with containment of the particular fluid body depending upon the particular application involved.

It is further recognized and anticipated that the present tablet feeder device will work with any shape or size of tablet either with or without a hole or aperture formed in the middle thereof. Although use of a tablet having a hole associated therewith is generally preferred because it is easier to load and hold a stack of tablets on any one of the platform members 36, 54, 86, 102, 114, 132, 148, 149 and 172, it is recognized that the present device could be configured to hold a plurality tablets T adjacent their outer peripheral surface. For example, a plurality of elongated members could be positioned on an appropriate frame structure at spaced locations along the periphery of the corresponding platform member such as the platform member 36 or 54, the platform member being slidably movable and positionable at selected locations along the plurality of elongated members. In such a configuration, the elongated members extending upwardly from the platform member would retain correspondingly shaped tablets positioned therebetween. This arrangement would be similar to the holding mechanism associated with holding clay targets in a skeet or trap mechanism. Still other mechanisms for accomplishing the holding of a plurality of tablets without a hole or aperture formed therein are recognized and envisioned.

In a toilet bowl application, the stackable arrangement of tablets eliminates flapper problems commonly associated with merely placing the tablets at the bottom of the tank 10 where movement of the tablet within the tank during repeated flushing can cause the tablet to relocate and become lodged between the flapper and its seating surface thereby causing the flapper to stick in an open position during toilet operation. In the swimming pool or spa skimmer application, use of the present device has the added advantage of alternating water balance or other chemical tablets in a particular stack of tablets on the present device. For example, in swimming pools trichloroisocyanurate tablets tend to decrease the pH factor. By alternating a trichlor tablet with a soda ash/bicarbonate of soda tablet, it is possible to automatically rebalance both the pH factor and total alkalinity. These chemicals cannot be intermixed in a tablet composition without destroying the advantages of the trichlor agent.

Regardless of the particular application, and regardless of the particular embodiment utilized, the present device provides a simple, economical device which will store a plurality of fluid treatment or other additive type tablets and will automatically feed such tablets into the fluid body so as to maintain a relatively constant tablet surface area within the fluid body so as to deliver a substantially continuous prescribed water treatment or additive dosage to the fluid body. The platform member associated with the present device is adjustably positionable so as to immerse any portion or any number of tablets within the fluid body depending upon the particular prescribed dosage required for that particular fluid body, and as the lowermost tablet begins dissolution, the next adjacent tablet will enter the fluid body thereby providing a relatively constant feed of treating agents or additives to the fluid body.

As is evident from the foregoing description, certain aspects of the present invention are not limited by the particular details of the examples illustrated herein, and it is therefore contemplated that other modifications and applications, or equivalents thereof, will occur to those skilled in the art. It is accordingly intended that the claims shall cover all such modifications and applications that do not depart from the sprit and scope of the present invention.

Other aspects, objects and advantages of the present invention can be obtained from a study of the drawings, the disclosure and the appended claims.

What is claimed is:

1. A device for holding a plurality of soluble tablets in a fluid body comprising:
    at least one elongated member;
    a platform member adaptable for holding the tablets in a stackable arrangement, said platform member being selectively positionable relative to at least a portion of the length of said at least one elongated member; and
    an attachment mechanism for positioning said device relative to the fluid body such that said platform member is adjustably positionable within the fluid body.

2. The device defined in claim 1 wherein said elongated member is adjustably positionable relative to said attachment mechanism.

3. The device defined in claim 1 wherein each tablet includes an opening extending therethrough adaptable for receiving said at least one elongated member, each of the plurality of tablets being slidably positionable onto said elongated member.

4. The device defined in claim 1 wherein said platform member includes an opening extending therethrough adaptable for receiving said elongated member.

5. The device defined in claim 4 wherein said platform opening and at least a portion of said at least one elongated member are cooperatively threadedly engagable.

6. The device defined in claim 4 including an adjustment member positioned below said platform member, said adjustment member being engagable with said at least one elongated member and being positionable along at least a portion thereof, said platform member being supported by said adjustment member.

7. The device defined in claim 1 wherein the fluid body is contained within a toilet bowl tank, said tank including at least one side wall, said attachment mechanism being attachable to said at least one side wall.

8. The device defined in claim 1 wherein the fluid body is contained within a toilet bowl tank, said tank including a floor portion, said attachment mechanism being attachable to said floor portion.

9. The device set forth in claim 1 wherein the fluid body is contained within a toilet bowl tank, said tank including a cover member, said attachment mechanism being attachable to said cover member.

10. The device defined in claim 1 wherein the fluid body is contained within a toilet bowl tank, said tank including an overflow tube, said attachment mechanism being attachable to said overflow tube.

11. The device defined in claim 1 wherein the fluid body is contained within a skimmer device, said skimmer device including at least one side wall, said attachment mechanism being attachable to said at least one side wall.

12. The device defined in claim 1 wherein the fluid body is contained within a skimmer device, said skimmer device including a cover member, said attachment mechanism being attachable to said cover member.

13. The device defined in claim 1 wherein the fluid body is contained within a skimmer device, said skimmer device including a skimmer basket having a floor portion associated therewith, said attachment mechanism being attachable to the floor portion of said skimmer basket.

14. The device defined in claim 1 wherein the fluid body is contained within a skimmer device, said skimmer device including a skimmer basket having a handle assembly associated therewith, said attachment mechanism being attachable to the handle assembly of said skimmer basket.

15. The device defined in claim 1 wherein the fluid body is contained within a skimmer device, said attachment mechanism including a portion of said skimmer device.

16. The device defined in claim 15 wherein said device is removably attachable to a portion of said skimmer device.

17. A device for automatically feeding a plurality of soluble tablets into a fluid body associated with a toilet bowl tank, the tank including a plurality of side walls, said device comprising:
    an elongated member;
    a platform member for holding the plurality of tablets, said platform member being adjustably positionable along at least a portion of the length of said elongated member; and
    a hanger member for positioning said device relative to the fluid body, said hanger member having a first portion engagable with said elongated member and having a second portion engagable with any one of said plurality of side walls whereby said platform member can be positioned such that any portion of one or more of the plurality of tablets can be immersed within the fluid body.

18. The device defined in claim 17 wherein the first portion of said hanger member includes an opening extending therethrough adaptable for receiving said elongated member.

19. The device defined in claim 18 wherein said hanger opening and at least a portion of said elongated member are cooperatively threadedly engagable, said elongated member being adjustably moveable relative to said first hanger portion.

20. The device defined in claim 18 including an adjustment member engagable with said elongated member, said adjustment member being selectively positionable along at least a portion of said elongated member and being positionable adjacent said first hanger portion for supporting said elongated member at a selected position relative to said first hanger portion.

21. The device defined in claim 17 wherein said platform member includes an opening extending therethrough adaptable for receiving said elongated member.

22. The device defined in claim 21 wherein said platform opening and at least a portion of said elongated member are cooperatively threadedly engagable.

23. The device defined in claim 21 including an adjustment member positioned below said platform member, said adjustment member being engagable with said elongated member and being selectively positionable along at least a portion thereof, said platform member being supported by said adjustment member.

24. The device defined in claim 17 wherein the second portion of said hanger member includes a downturned flange portion adaptable for engaging the peripheral edge of any one of said plurality of side walls.

25. The device defined in claim 17 wherein the second portion of said hanger member includes a suction cup type member cooperatively engagable with any one of said plurality of side walls.

26. A device for automatically feeding a plurality of soluble tablets into a fluid body associated with a toilet bowl tank, the tank including a floor portion, a plurality of side walls, and a closure member, said device comprising:

an elongated member;

a platform member for holding the plurality of tablets, said platform member being adjustably positionable along at least a portion of the length of said elongated member; and an attachment mechanism associated with one end portion of said elongated member for removably positioning said device within the toilet bowl tank relative to the fluid body contained therein whereby said platform member can be positioned such that any portion of one or more of the plurality of tablets can be immersed within the fluid body.

27. The device defined in claim 26 wherein said attachment mechanism is removably attachable to the floor portion of the toilet bowl tank.

28. The device defined in claim 26 wherein said attachment mechanism is removably attachable to the closure member.

29. The device defined in claim 26 wherein said attachment mechanism includes a suction cup type member.

30. The device defined in claim 26 wherein said platform member includes an opening extending therethrough adaptable for receiving said elongated member.

31. The device defined in claim 30 wherein said platform opening and at least a portion of said elongated member are cooperatively threadedly engagable.

32. The device defined in claim 30 including an adjustment member positioned below said platform member, said adjustment member being engagable with said elongated member and being selectively positionable along at least a portion thereof, said platform member being supported by said adjustment member.

33. The device defined in claim 26 wherein the toilet bowl tank includes an overflow tube, said attachment mechanism being removably attachable to said overflow tube.

34. The device defined in claim 26 wherein each tablet includes an opening extending therethrough adaptable for receiving said elongated member, each of the plurality of tablets being slidably positionable onto said elongated member and being supported by said platform member.

35. A device for automatically feeding a plurality of soluble tablets into a fluid body associated with a skimmer device, said device comprising:

an elongated member;

a platform member for holding the plurality of tablets, said platform member being adjustably positionable along at least a portion of the length of said elongated member; and an attachment mechanism associated with one end portion of said elongated member for removably positioning said device within the skimmer device relative to the fluid body contained therein whereby said platform member can be positioned such that any portion of one or more of the plurality of tablets can be immersed within the fluid body.

36. The device defined in claim 35 wherein said platform member includes an opening extending therethrough adaptable for receiving said elongated member.

37. The device defined in claim 36 including an adjustment member positioned below said platform member, said adjustment member being engagable with said elongated member and being positionable along at least a portion thereof, said platform member being supported by said adjustment member.

38. The device defined in claim 36 wherein said platform opening and at least a portion of said elongated member are cooperatively threadedly engagable.

39. The device defined in claim 35 wherein said skimmer device includes a cover member, said attachment mechanism being attachable to said cover member.

40. The device defined in claim 35 wherein said skimmer device includes a skimmer basket having a floor portion associated therewith, said attachment mechanism being attachable to the floor portion of said skimmer basket.

41. The device defined in claim 35 wherein said skimmer device includes a skimmer basket having a handle assembly associated therewith, said attachment mechanism being attachable to the handle assembly of said skimmer basket.

42. The device defined in claim 41 wherein said skimmer handle assembly includes a portion having an opening extending therethrough adaptable for receiving one end portion of said elongated member.

43. The device defined in claim 35 wherein said skimmer device includes at least one side wall, said attachment mechanism forming an extension of said elongated member and including a portion attachable to said at least one side wall.

44. The device defined in claim 43 wherein said elongated member and said attachment mechanism form a substantially j-shaped member.

45. The device defined in claim 35 wherein said attachment mechanism includes a shoulder portion associated with the skimmer device, said shoulder portion having an elongated opening associated therewith adaptable for receiving one end portion of said elongated member, said elongated member being positionable within said shoulder portion opening.

46. The device defined in claim 35 wherein each tablet includes an opening extending therethrough adapatable for receiving said elongated member, each of the plurality of tablets being slidably positionable onto said elongated member for support by said platform member.

47. A device for holding a plurality of soluble tablets in a fluid body comprising:

a tablet holding member for holding the plurality of tablets; and a bracket member engagable with said tablet holding member for positioning said tablet holding member relative to a fluid body, said bracket member having a portion thereof engagable with said tablet holding member at selected locations thereon whereby said tablet holding member can be positioned such that any portion of any one or more of the plurality of tablets can be immersed within the fluid body.

48. The device defined in claim 47 wherein said bracket member includes a plurality of openings, said tablet holding member including a member selectively engagable with any one of said plurality of openings.

49. The device defined in claim 47 wherein said bracket member includes at least one set of a plurality of openings, said tablet holding member including at least one member engagable with any one of said plurality of openings within said at least one set for selectively positioning said tablet holding member relative to the fluid body.

50. The device defined in claim 47 wherein said tablet holding member includes an elongated member, each tablet including an opening extending therethrough adaptable for receiving said elongated member, each of the plurality of tablets being slidably positionable onto said elongated member.

51. The device defined in claim 50 wherein said tablet holding member includes a platform member.

52. The device defined in claim 47 wherein the fluid body is contained within a toilet bowl tank, said tank including at least one side wall, said bracket member being attachable to said at least one side wall.

53. A device for automatically feeding a plurality of soluble tablets into a fluid body associated with a toilet bowl tank, the tank including a plurality of side walls, said device comprising:

a tablet holding member for holding the plurality of tablets; and a bracket member engagable with said tablet holding member for positioning said tablet holding member relative to fluid body, said bracket member having a first portion engagable with any one of said plurality of side walls and having a second portion engagable with said tablet holding member at selected locations therealong whereby said tablet holding member can be positioned such that any portion of any one or more of the plurality of tablets can be immersed within the fluid body.

54. The device defined in claim 53 wherein the first portion of said bracket member includes a downturned flange portion adaptable for engaging the peripheral edge of any one of said plurality of side walls.

55. The device defined in claim 53 wherein said tablet holding member includes an elongated member, each tablet including an opening extending therethrough adaptable for receiving said elongated member, each of the plurality of tablets being slidably positionable onto said elongated member.

56. The device defined in claim 53 wherein said tablet holding member includes a platform member and an elongated member, said platform member and said elongated member being adaptable for holding the plurality of tablets in a stackable arrangement relative to said platform member.

57. The device defined in claim 53 wherein the second portion of said bracket member includes a plurality of openings, said tablet holding member including a portion thereof cooperatively engagable with at least one of said plurality of openings for selectively positioning the tablet holding member relative to the fluid body.

58. The device defined in claim 53 wherein the second portion of said bracket member includes a pair of spaced apart sets of plurality of openings, said tablet holding member including a pair of members cooperatively engagable respectively with any one of the openings associated with each of said pair of spaced sets of plurality of openings for selectively positioning said tablet holding member relative to the fluid body.

59. The device defined in claim 54 wherein the first portion of said bracket member includes a tab for facilitating disengagement of said first bracket portion with the peripheral edge of any one of said plurality of side walls.

60. A method for automatically feeding a plurality of soluble tablets into a fluid body, the method comprising the steps of:

providing at least one elongated member;

providing a platform member adaptable for holding the plurality of tablets, said platform member being selectively positionable relative to at least a portion of the length of said at least one elongated member;

attaching said elongated member and said platform member to a portion of the structure containing the fluid body such that said platform member is adjustably positionable within the fluid body;

loading a plurality of soluble tablets onto said platform member; and selectively adjusting the position of said platform member relative to said elongated member such that any portion of one or more of the plurality of tablets can immersed within the fluid body.

61. A method for automatically feeding a plurality of soluble tablets into a fluid body, the method comprising the steps of:

providing a tablet holding member;

providing a bracket member engagable with the tablet holding member, the tablet holding member being engagable with said bracket member at selected locations thereon for selectively positioning the tablet holding member relative to the fluid body;

attaching the bracket member to a portion of the structure containing the fluid body;

loading a plurality of soluble tablets onto said tablet holding member; and selectively adjusting the position of the tablet holding member relative to the bracket member such that any portion of one or more of the plurality of tablets can be immersed within the fluid body.

* * * * *